United States Patent [19]

Holzapfel et al.

[11] Patent Number: 4,510,174

[45] Date of Patent: Apr. 9, 1985

[54] METHOD OF MANUFACTURING A THIN LAYER DETECTOR FOR AN INTEGRATING SOLID STATE DOSIMETER

[75] Inventors: Georg Holzapfel, Berlin; Jan Lesz, Brunswick, both of Fed. Rep. of Germany

[73] Assignee: Georg Dr. Holzapfel, Berlin, Fed. Rep. of Germany

[21] Appl. No.: 513,022

[22] Filed: Jul. 12, 1983

[30] Foreign Application Priority Data

Jul. 12, 1982 [DE] Fed. Rep. of Germany ....... 3226378

[51] Int. Cl.$^3$ ............................ G01T 1/11; B05D 5/00
[52] U.S. Cl. .......................................... 427/65; 427/71;
427/157; 427/189; 427/190; 427/205; 427/292;
427/293; 427/423; 427/194; 427/309; 427/261;
250/484.1
[58] Field of Search .................... 427/65, 71, 157, 77,
427/191, 190, 205, 293, 189, 423, 292, 356, 194,
309, 261; 250/484.1

[56] References Cited

U.S. PATENT DOCUMENTS

| Re. 28,340 | 2/1975 | Stewart et al. | 250/484.1 X |
|---|---|---|---|
| 4,225,785 | 9/1980 | Ducos et al. | 427/77 |
| 4,286,165 | 8/1981 | Jones et al. | 250/484.1 X |
| 4,321,287 | 3/1982 | Minamide et al. | 427/157 |

OTHER PUBLICATIONS

M. Petel and G. Holzapfel, "α/β-Al$_2$O$_3$ Exoelectron Emitters for Dosimetry", (reprint) Proceedings of the 5th International Symposium on Exoelectron Emission and Dosimetry, Zvikov, Sep. 1976, pp. 142–146.
M. Petel and G. Holzapfel, "Flame-Sintered Ceramic Exoelectron Dosimeter Samples", Proceedings of the VIth International Symposium on Exoelectron Emission and Applications, Oct. 8–13, 1979, Part II, pp. 169–170.
M. Petel and G. Holzapfel, "Exoemissive Properties of a Mixture of Aluminium oxides in a α and β Phases: Dosimetry Applications", Proceedings, IVth International Congress, IRPA, Paris, Apr. 24–30, 1977, pp. I289–I292.
G. Holzapfel et al, "Optimization of Flame-Sintered Al$_2$O$_3$ Exoelectron Dosimetry Materials", Nuclear Instruments and Methods, (1980) pp. 115–116.
G. Holzapfel et al, "Comparative TL-TSEE Measurements on Flame-Sintered Lif TLD Materials", Nuclear Instruments and Methods, (1980) pp. 107–108.
M. Petel and G. Holzapfel "Exoelectron Emission from Plasma Flame Sprayed Crystalline α/β-Alumina Mixtures", Lectures of the Vth Polish Seminar on Exoelectron Emission and Related Phenomena Karpacz, Poland 1978, pp. 1–5.

Primary Examiner—John D. Smith
Assistant Examiner—Bernard F. Plantz
Attorney, Agent, or Firm—Spencer & Frank

[57] ABSTRACT

A method of manufacturing a thin layer detector for integrating solid state dosimeters, in particular for thermoluminescence dosimeters (TLD's), from thermoluminescent powder material, comprising the simultaneous application of high pressure and elevated temperature to the powder layer at selected values (working point) sufficient to cause physico-chemical bonding of the layer with a suitably prepared substrate by plastic flow of the powder grains.

21 Claims, 17 Drawing Figures

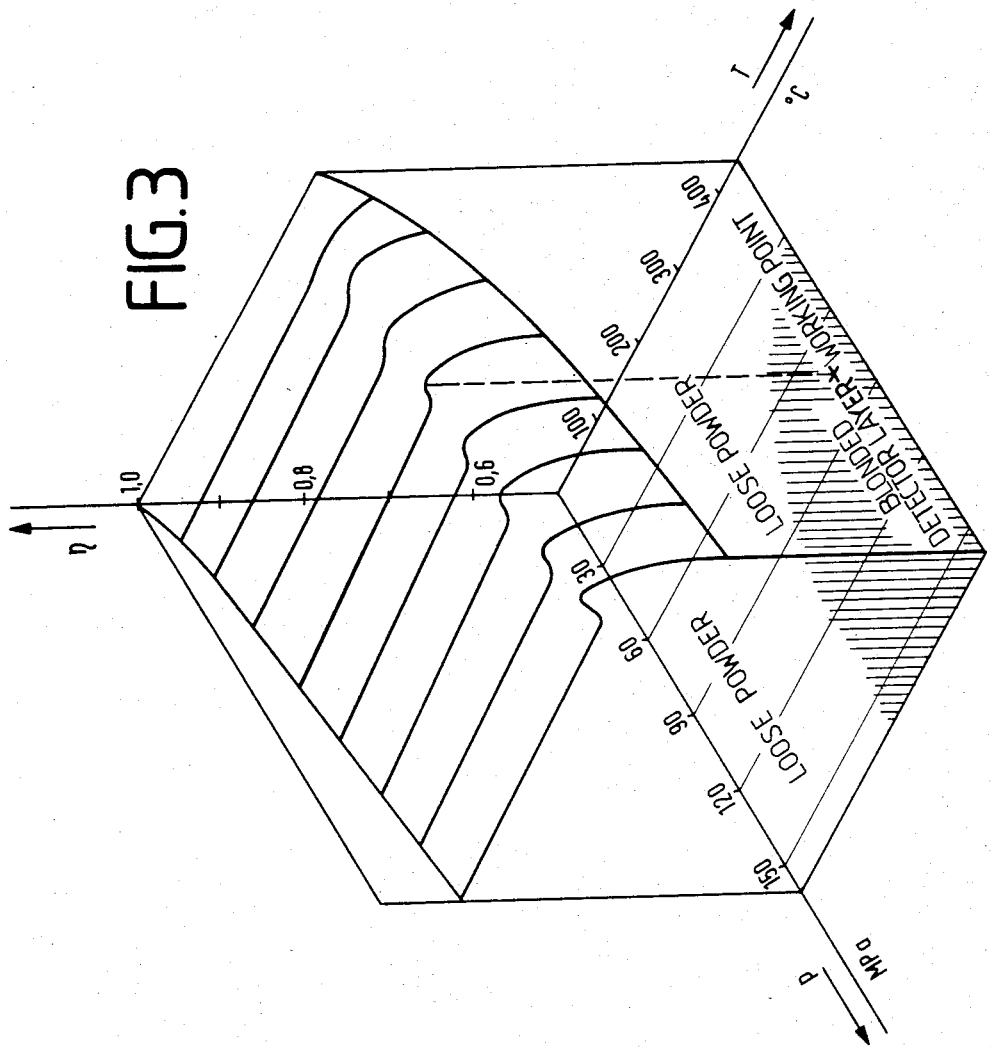

100 μm

METHOD OF MANUFACTURING A THIN LAYER DETECTOR FOR AN INTEGRATING SOLID STATE DOSIMETER

BACKGROUND OF THE INVENTION

The invention relates to a method of manufacturing a thin layer detector for an integrating solid state dosimeter and a detector manufactured according to this procedure.

In integrating solid state dosimeters, electrons which have been liberated during an ionizing irradiation are captured and stored in atomic trapping sites of the detector material. Their release can be stimulated, e.g., by heating the detector in the read-out process, and is accompanied by the emission of photons, called thermoluminescence (TL), and sometimes by the emission of electrons, called thermally stimulated exoelectron emission (TSEE). The quantity of emitted particles provides a measure of the radiation dose received previously. Besides some sulfates and oxides, certain inorganic salts, such as lithiumfluoride (LiF) doped with activators like magnesium (Mg) and titanium (Ti), are applied to devices for thermoluminescence dosimetry (TLD) and form a main subject of this invention. Generally, the detector fabrication starts from powders of these substances.

Sometimes, the TL-powder is contained loosely in a capsule during radiation exposure and is redistributed onto a heating tray during read-out. In general, however, the powders are processed into a solid detector.

According to a further known process, the handling of TL-powder is facilitated by embedding the powder permanently in a plastic matrix such as polytetrafluoroethylene, (PTFE), as sold for example under the trademark Teflon. Since the TL-powder in such an arrangement constitutes only up to 30% of the detector volume, the radiation response is considerably lowered. Further, since the PTFE disk may curl off the heating tray, special care must be taken with regard to the thermal contact. Moreover, to avoid detector deterioration, the temperature must not exceed 300° C., whereas post-irradiation annealing should be conducted at up to 400° C. for regeneration of the detector. Other problems of PTFE-based detectors are related to conserving optical transparency and avoiding electrostatic dust attraction.

More frequently, solid detectors are fabricated by compression of the powder at elevated temperatures in a vessel, and then extruding the fused material through a die. Chips of appropriate shape are sliced off the extrusion and polished, thus obtaining compact, self-supporting detectors. However, owing to the physical fragility of such detectors their thickness must not be lower than 0.5 mm or even 1 mm.

In a further known method of dosimeter manufacturing, the dry TL-powder is sprinkled onto a self-adhesive, heat resistant plastic tape (Kapton). However, the sensitivity and the stability of the radiation response of such detectors turned out to be rather low.

By suspending the detector powder in a liquid in a known manner, smooth sedimentation layers may be formed on an arbitrary substrate. The sedimentation may be forced by filtration, i.e. by drawing the liquid through the substrate which must be porous throughout in order to act as a filter body. To improve the adherence of the filtrated powder, a subsequent isostatic compression at room temperature is advised. In order to avoid high temperatures which may deteriorate the materials, this method has been developed particularly for the preparation of TSEE-detectors. A subsequent annealing is performed only if additional sintering of the powder grains in the ready layer is intended.

A known specific hot preparation method uses powder spraying through a chemical flame, so as to bond the particles with each other and with a suitable substrate. However, it turned out that flame temperature and composition are very critical parameters for the deposition of intact TL-detector layers.

From the above review of the existing diverse devices and processes, there still remains the problem of constructing a solid state dosimeter with a thin detector layer, which is not deteriorated with respect to its radiation response by a preparation procedure at elevated temperatures, e.g. up to 400° C., and which is bonded permanently on a heat-resistant substrate, preferably of a low atomic number material.

SUMMARY OF THE INVENTION

The above problem is solved according to the present invention by a procedure or method of manufacturing a thin layer detector for integrating solid state dosimeters, in particular for thermoluminescence dosimeters (TLD's), from thermoluminescent powder material comprising the steps of: providing a suitably prepared substrate, depositing a layer of thermoluminescence powder material on a surface of the substrate; and simultaneously applying high pressure and an elevated temperature to the powder material at respective values sufficient to cause plastic flow of the powder grains and physico-chemical bonding of the layer to the substrate.

The invention makes use of the fact that under such conditions of simultaneous elevated temperature and pressure, a working point, i.e., corresponding temperature and pressure values, may be found in a diagram, where temperature, pressure and thermoluminescence-response of a material are displayed, where the TL-response of the resulting detector layer is still sufficient although there is normally a decrease in TL-response with higher pressures. In a specific preferred embodiment of the invention the working point is situated or selected at a relative maxima of the TL-response of the detector layer.

The high pressure and high temperature at certain selected values simultanously acting on a layer of the powder (preferably in a press with heated piston and heated support) cause, by plastic flow of the powder grains, a physico-chemical bonding of the resulting detector layer with a suitably prepared substrate.

Among the well-known detector materials used in solid state dosimetry, salts such as lithiumfluoride (LiF), lithiumborate ($Li_2B_4O_7$) and calciumfluoride ($CaF_2$) are most appropriate to be processed according to this invention because of easy plastic flow of such materials.

For various reasons, e.g. for interface or skin dosimetry, it is desirable for the detector material to be concentrated in a thin layer. This requires suitable procedures for layer preparation on appropriate substrates. If tissue equivalence of the dosimeter is required, all substrate parts should be constructed from materials of low effective atomic number Z.

The choice of suitable low-Z substrates used for processing according to this invention can be made between the elements beryllium (Be), boron (B), magnesium (Mg), aluminum (Al), and silicon (Si), including their alloys and between compounds such as berylliumoxide (BeO), magnesiumoxide (MgO), and aluminumoxide (Al$_2$O$_3$), including mixtures of these ceramics. The surface of these substrates is preferably prepared for use according to the invention by etching and/or sandblasting. Some of these substrates are already used to carry flame-sprayed detector layers.

According to another feature of the invention, the surface of a substrate may be prepared by covering it with a flame-sprayed layer, e.g. of boron (B), magnesium (Mg), aluminum (Al), silicon (Si), or their alloys, or magnesiumoxide (MgO), aluminumoxide (Al$_2$O$_3$), or their mixtures, which layer than acts as a bonding layer between the substrate and the hot-pressed detector layer.

The process according to this last feature of the invention lends itself to the use of graphite (C) substrates which are covered by hot-pressed detector layers according to this invention. The use of a flame-sprayed bonding layer of aluminum to bond flame-sprayed detector layers on graphite substrates is already known.

The efficiency of the TL-response is enhanced appreciably if the light generated in the detector volume during read-out can be reflected at the interface between the detector layer and the substrate or the bonding layer, respectively, which is the case for metals, i.e. for beryllium (Be), aluminum (Al), or their alloys.

According to another feature of the invention, if non-reflecting substrates or bonding layers, particularly of boron (B) or silicon (Si), are used, they preferably are covered by a reflection layer of beryllium (Be), magnesium (Mg), aluminum (Al), or their alloys, or of magnesiumoxide (MgO), aluminumoxide (Al$_2$O$_3$), or their mixtures. According to this feature of the invention, the reflection layer preferably is deposited or fabricated by flame-spraying.

According to a preferred embodiment of the invention, for example, a boron (B) bonding layer covered with an Al$_2$O$_3$ reflection layer, both fabricated by flame-spraying, form a double-sandwich device together with the substrate, e.g. of graphite (C), below and the detector layer, e.g. of lithiumfluoride (LiF), on top (C/B/Al$_2$O$_3$/LiF-configuration). As a part of a dosimeter, the detectors may be provided in different shapes.

If a permanent identification of the detector or dosimeter card, respectively, is desired, according to another feature of this invention, a code structure, e.g. an array of holes, is engraved in the portions of a substrate which are non-covered by the detector layer formed according to the invention.

In order to simultaneously fabricate numerous detectors according to this invention in a batch, a large substrate plate is used and provided with the detector layer by hot pressing. Thereafter, the substrate is divided, e.g. by cutting or sawing, into the individual detectors.

In another significant feature of this invention the large substrate plate is provided with a groove pattern in order to break out all detectors of a batch simultaneously by a short pressure overlaod (shock).

It is still another feature of the invention that the pressing tool are provided with an edge and groove pattern for simultaneously breaking the substrate into a plurality of detectors in a batch.

Hot-pressing to produce thin layer detectors according to this invention is performed preferably by a press with a piston and a support as the pressing tools. The invention is however not restricted to this manner of hot pressing. According to the invention, the hot-pressing procedure may also be performed advantageously by rolling, using heated and burdened rolls as the pressing tools.

BRIEF DESCRIPTION OF THE DRAWINGS

Other objects and many of the attendent advantages of this invention will be readily appreciated as the same becomes better understood by reference to the following detailed description when considered in connection with the accompanying drawings, in which like reference numerals designate like parts throughout the FIGURES thereof and wherein:

FIG. 3 is a three-dimensional diagram of the gain, i.e. the TL-response to radiation normalized to that of loose untreated powder, over the pressure (p)/-temperature (T) plane, for a preferred embodiment of a detector according to the invention.;

DETAILED DESCRIPTION OF THE PREFERRED EMBODIMENT

Figure 1A:
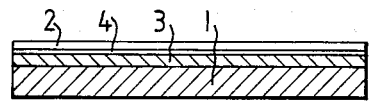
FIGS. 1a, 1b and 1c illustrate cross-sectional views of different embodiments of a detector according to the invention.

Referring now to FIG. 1a, there is shown a first embodiment of the invention, including a detector layer 2 of a TL-material which is hot-pressed onto a substrate 1 so that it covers the entire surface of the substrate. Depending on the materials used for the layers 1 and 2, the detector may also include a bonding layer 3 disposed on the surface of the substrate 1 and, depending on the material of the layers 1 and 3, possibly a reflecting layer 4 disposed between the detector layer 1 and the underlying bonding layer 3 or substrate 1.

Figure 2A:
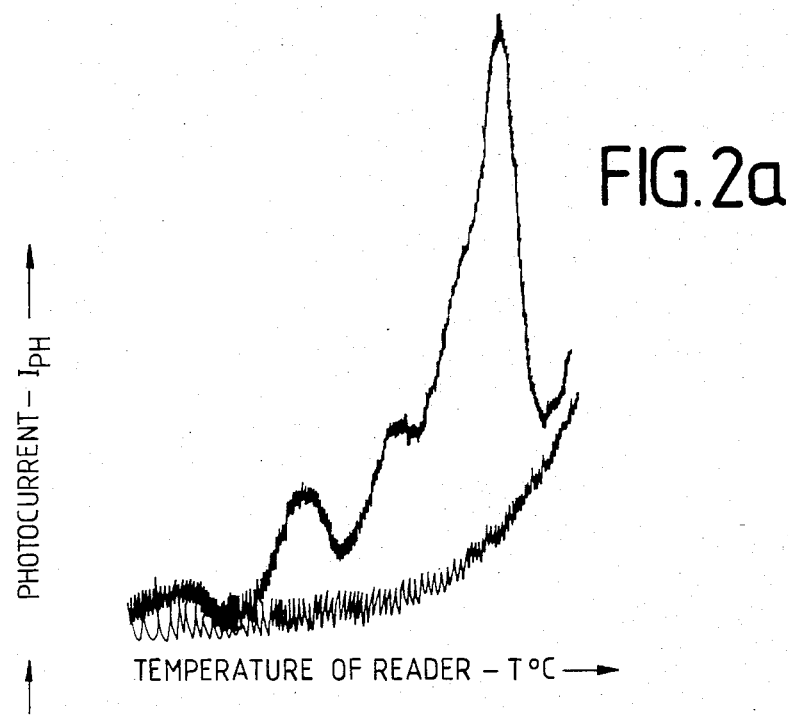
FIG. 2a illustrates two curves of the photocurrent versus temperature of the reader for one embodiment of a detector according to the invention, with the upper curve being the "glow curve" for the detector and the lower curve being the "background" of the detector including the reader.

According to the embodiment of the invention illustrated in FIG. 2a, the detector layer 2 is hot-pressed on a substrate 1 so that it only partially covers the surface of the substrate 1.

Figure 1B:
Figure 1C:
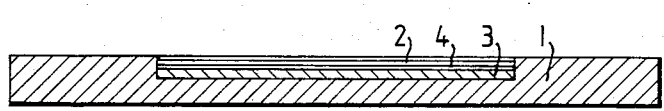

Finally, according to another embodiment of the invention illustrated in FIG. 1c, the detector layer 2 is hot-pressed into a recess formed in the surface of the substrate 1 in order to provide better protection against mechanical damage. Although a bonding layer 3 and a reflection layer 4 are shown in each of the embodiments of FIGS. 1a–1c, it is to be understood that one or both of these layers may be omitted depending on the materials used for the detector and substrate layers 1 and 2.

As indicated above, the detector layer 2 may be formed of well-known TL-detector materials used in solid state dosimetry. Preferably, such detector materials are materials which have an easy plastic flow. Among the well-known detector material used in solid state dosimetry, the inorganic salts, such as doped lithiumfluoride (LiF), lithiumborate ($Li_2B_4O_7$) and calciumfluoride ($CaF_2$), are particularly appropriate to be processed by the method according to this invention due to their easy plastic flow.

For various reasons pointed out above, it is desirable to form all parts of the substrate from materials of low effective atomic number Z. Accordingly, suitable materials for low-Z substrates which can be used for processing according to the invention are the elements beryllium (Be), boron (B), magnesium (Mg), aluminum (Al) and silicon (Si), including their alloys, and compounds such as berylliumoxide (BeO), magnesiumoxide (MgO) and aluminumoxide ($Al_2O_3$), including mixtures of these ceramics. Preferably, the surface of the substrate is initially prepared by etching and/or sandblasting.

If a bonding layer 3 is desirable between the materials of the detector layer 2 and the substrate 1, then the surface of the substrate 1 is further prepared by covering it with a flame-sprayed layer, e.g. of boron (B), magnesium (Mg), aluminum (Al), silicon (Si), or their alloys, or magnesiumoxide (MgO), aluminumoxide ($Al_2O_3$), or their mixtures. The use of such a bonding layer 3 further permits the use of graphite (C) as a substrate material which can be covered by hot-pressed detector layers according to this invention.

As further indicated above, the efficiency of the TL-response of a detector is enhanced appreciably if the light generated in the detector volume during read-out, can be reflected at the interface between the detector layer 2 and either the substrate 1 or the bonding layer 3. This is the case wherein the substrate 1 or the bonding layer 3 is formed of a metal, i.e. for beryllium (Be), aluminum (Al), or their alloys. Accordingly, if non-reflecting materials, particularly boron (B) or silicon (Si), are used for the substrate 1 or the bonding layer 3, the substrate surface is Preferably further prepared by covering same (or the bonding layer) with a reflection layer 4 of beryllium (Be), magnesium (Mg), aluminum (Al), or their alloys, or mangesiumoxide (MgO), aluminumoxide ($Al_2O_3$), or their mixtures. Preferably, the reflection layer 4 is produced by flame-spraying.

The thickness of the diverse layers can be varied appreciably depending on the grain size of the materials undergoing flame spraying or hot-pressing, respectively. Optimum conditions are found with the following thickness combination: $100\mu$ for the bonding layer 3; $50\mu$ for the reflection layer 4, and 100–200$\mu$m for the TL-sensitive layer 2. These are only mean values since with flame spraying rather rough interfaces are produced, see FIGS. 4c and 4d.

The principle and the realization of the invention will be illustrated and described below mainly by means of two examples. The detectors of these examples each include a substrate 1, as shown in FIG. 1c, which is a circular disk 17 mm in diameter and 1 mm thick, with a central recess 10 mm in diameter and 0.5 mm deep. In each case, the detector material is 24 mg of commercial lithiumfluoride doped with magnesium and titanium (LiF:Mg, Ti) in powder form. Hot-pressing of the powdered detector material was performed at a working point of 75 MPa and 400° C. It was found that the thermoluminescence characteristics of this detector material, particularly its glow curve (TL-photocurrent versus linearly increasing temperature of the read-out) was not seriously changed by hot-pressing the powder into a thin layer according to the present invention.

The hot-pressing procedure is generally performed within a few seconds.

The first example, whose characteristic is illustrated in FIG. 2a, demonstrates the results obtained with the simplest detector configuration, namely a sandblasted aluminum substrate 1 carrying the lithiumfluoride detector layer 2 without any additional layers i.e., a Al/LiF-detector. The upper curve in the diagram of FIG. 2a is the so-called "glow-curve", showing the photocurrent $I_{ph}$ versus the reader-temperature T. The response to radiation (0.012 cGy $\gamma$-irradiation) of this TLD device, as well as its glow curve, are close to those of loose powder of the same mass (24 mg) distributed on a tray. A limitation becomes visible in the low-dose range since light, which is probably emitted from the Al/LiF-interface, lifts the irradiation-independent background current of this detector steeply with increasing read-out temperature. The lower curve in FIG. 2a is a signal representing the "background" of the detector including the reader. As a comparison, FIG. 2a shows the "background" of the reader itself, which "background" is contained in the curves of FIGS. 2a and b as distortion.

Figure 2B:
FIG. 2b is a curve of photocurrent versus temperature showing the "bachground" of the reader used to provide the signals of FIGS. 2a and 2c.
Figure 2C:
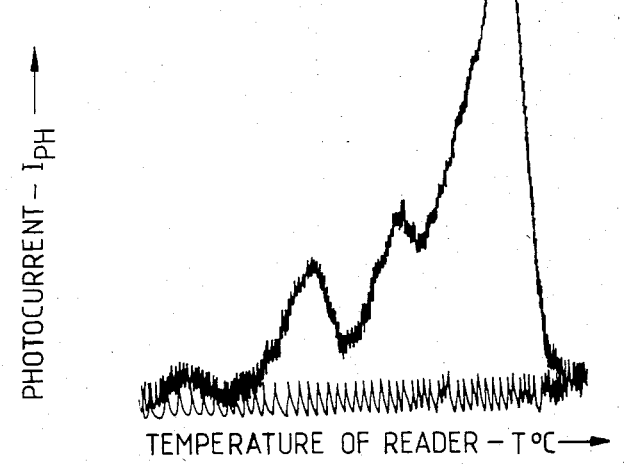
FIG. 2c illustrates two curves similar to those of FIG. 2a for a second preferred embodiment of a detector according to the invention.

The second example, whose characteristic is shown in FIG. 2c, demonstrates the results obtained with the most elaborate detector configuration according to the present invention, namely a detector with a graphite substrate 1, a bonding layer 3 of boron, and a reflection layer 4 of aluminumoxide below the hot-pressed lithiumfluoride detector layer 2, i.e., a C/B/$Al_2O_3$/LiF-detector. This device meets closely with most of the requirements of thermoluminescence dosimetry. In particular, as shown in FIG. 2c, the background current of this device is appreciably lowered, surpassing only slightly the background current, as shown in FIG. 2b, generated by the heater and photomultiplier of the reader. The glow curve of the material (24 mg) of this example is hardly disturbed after low irradiation (0.012 cGy $\gamma$-irradiation), and measurements down to $10^{-3}$ cGy are feasable.

In order to validate the basic procedure of this invention, the formation of a hot-pressed detector layer with optimum TL-response to radiation shall be considered.

The experimental results refer to a C/B/Al$_2$O$_3$/LiF-detector (see also FIG. 2c), but they may be significant as well for the other detector modifications described above.

FIG. 3 shows the efficiency $\eta$, i.e. the TL-response to radiation normalized to that of loose untreated powder, over the pressure (p)-temperature (T) plane. As can be seen, the general effect of increasing pressure is to lower the efficiency. However, as can likewise be seen in FIG. 3, when increasing the temperature along an isobaric line, recovery of the TL-material, in this case, LiF, is observed around 400° C., followed by a steep decrease of efficiency $\eta$.

The detector layer 2 is firmly bonded onto the prepared substrate 1 only above certain p/T-values, as shown by the dashed area in the base plane of FIG. 3. Below there p/T values, i.e., in the undashed portion of the base or p/T plane, the powder remains loosely on the surface of the substrate. The working point for hot-pressing according to the invention must be placed inside this dashed area, and in the particular case illustrated is selected at a pressure of 75 MPa and a temperature of 400° C. As shown in FIG. 3, a relative maxima of the efficiency occurs at this selected working point.

The boundary of transition between powder left loosely on the substrate after hot-pressing and a firmly bonded detector layer, and therewith the choice of the working point, may differ for other detector combinations of this invention. The reason for this lies in variations of the affinity of the substrate, the bonding layer, and reflection layer, respectively, for chemical reactions with a certain detector material under plastic deformation. Equally, variation of the surface roughness, causing clamping of the detector layer after plastic flow of the material into the space around more or less tilted edges and corners, must be considered (physico-chemical bonding).

Figure 4A:
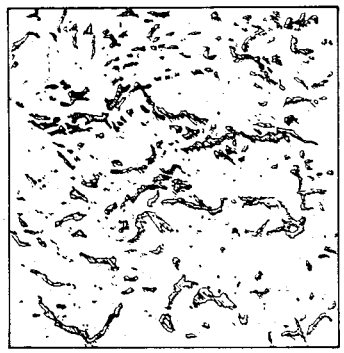
FIG. 4a is a view of the surface of a sandblasted Al substrate taken by means of a scanning electron microscope.
Figure 4B:
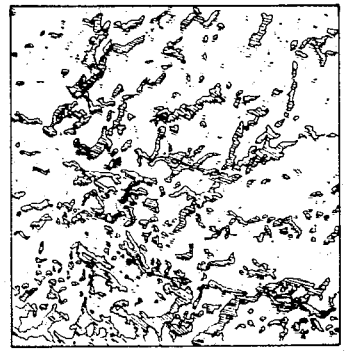
FIG. 4b is a view of the surface of an ultrasonicly cleaned but otherwise untreated surface of a graphite substrate taken by means of a scanning electron microscope.
Figure 4C:
FIG. 4c is a view of the surface of a flame-sprayed boron bonding layer taken by means of a scanning electron microscope.
Figure 4D:
FIG. 4d is a view of the surface of a flame-sprayed Al$_2$O$_3$ reflection layer taken by means of a scanning electron microscope.
Figure 4E:
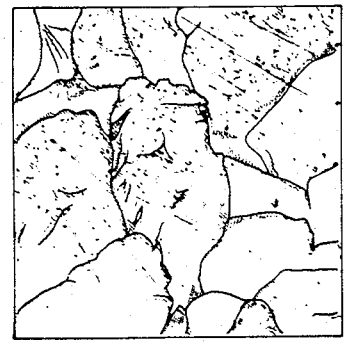
FIG. 4e is a view of the surface of a hot-pressed bonded LiF TLD detector layer according to the invention taken by means of a scanning electron microscope.
Figure 4F:
FIG. 4f is a view of the surface of an original LiF TLD powder layer taken by means of a scanning electron microscope.

An immediate impression of the diverse steps involved in the method according to the invention for the devices described above are given by pictures, as shown in FIGS. 4a–4f, of surfaces of various layers which were taken during the manufacturing process by means of a scanning electron microscope. The following surfaces are displayed: FIG. 4a shows the sandblasted Al substrate; FIG. 4b shows the ultrasonically cleaned but otherwise untreated graphite substrate; FIG. 4c shows the flame-sprayed boron bonding layer; FIG. 4d shows the flame-sprayed Al$_2$O$_3$ reflection layer; FIG. 4e shows the hot-pressed bonded LiF TLD detector layer; and FIG. 4f shows the original LiF TLD powder layer prior to bonding.

As demonstrated by FIG. 4e, the LiF grains bonded, respectively, with the substrate, with the intermediate layers and with each other do not disappear completely by the hot-pressing procedure. That is, in this particular example of a detector manufactured by the procedure according to this invention, the grain bounderies remain visible as lines or furrows in the otherwise smooth surface.

The essential advantages of this invention result from a thin detector layer and its invariable connection with a heat-resistant substrate of low atomic number. In detail, this enables a more uniform heating of the detector volume as the source of TL light, and a more reliable heat contact to the heating system of the reader. Consequently, fast dose read-outs with high reproducibility become feasible, and standard deviations of 1% for a series of equal irradiation/reading-cycles are readily obtained for a single detector. Moreover, the radiation sensitivity of the original TL powder is nearly conserved for the hot-pressed thin detector layers according to this invention in contrast to extruded detector chips, and with a mass reduction to 25% as compared with chips, the same low-dose detection limit (threshold) of $10^{-3}$cGy is reached. Moreover, thin layer detectors generally tend to exhibit a more constant response to spectral variations of radiation (flat energy dependence). Of major practical interest for large scale application of TLD in radiation protection are low variations of sensitivity, both within and between detector batches. For thin-layer detectors manufactured according to this invention, standard deviations below 5% are achieved, thus avoiding individual detector calibrations which is frequently necessary in the existing TLD systems.

The method of hot pressing according to the invention may be supplemented by shaping the substrate as well as the pressing tools in diverse ways to meet the individual requirements of detector or dosimeter design and their large scale fabrication.

As outlined above, a large substrate plate covered completely or partially with the layer material may be the origin of a whole detector batch, i.e. a plurality of thin layer detectors which may be subsequently divided by cutting or sawing.

Figure 5:
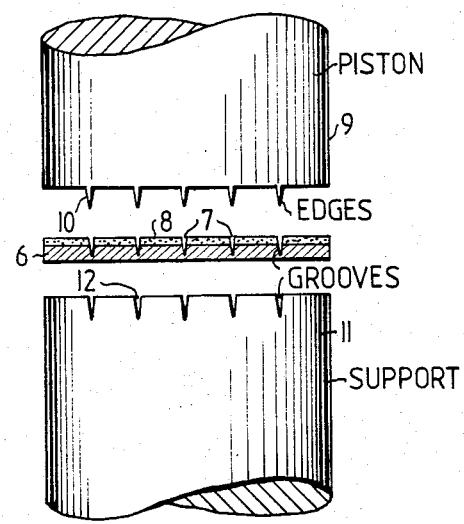
FIG. 5 is a schematic view showing groove and edge pattern arrangements on a large substrate plate, on the support and on the piston.
Figure 7:
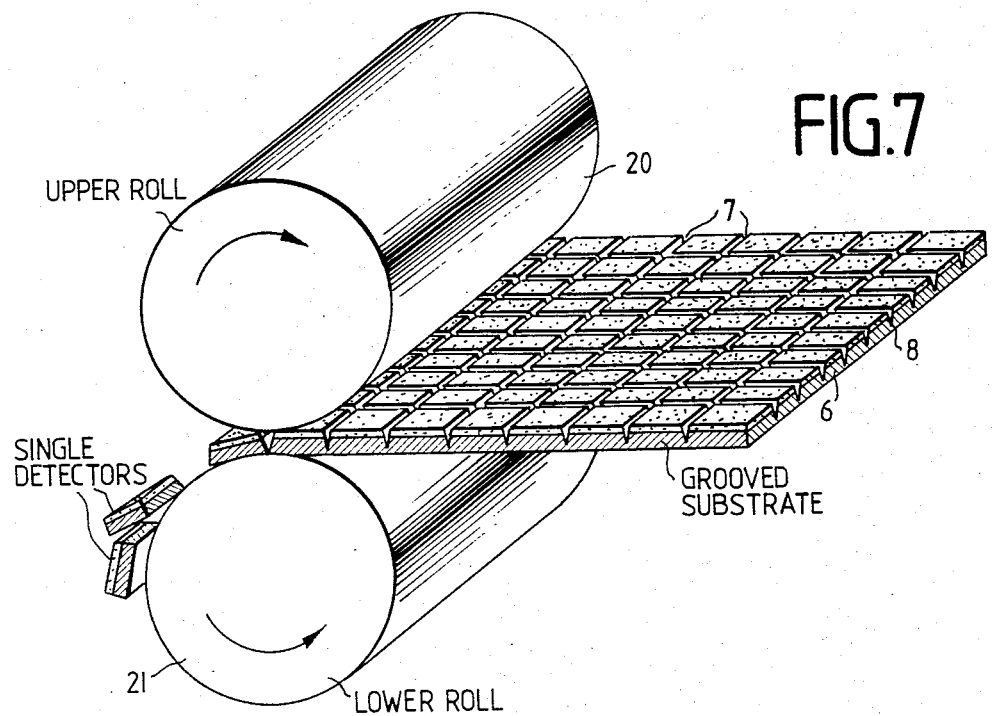
FIG. 7 is a schematic view showing the use of rolls for hot-pressing and breaking detectors from a large grooved substrate plate.

In order to facilitate the dividing procedure, the large substrate plate 6 may be provided with a groove pattern 7 as illustrated in FIGS. 5 and 7, e.g. by a "chocolate bar"-like groove pattern. In this example, the surface of the substrate including the individual detector areas is covered completely with the TL-sensitive layer 8.

The dividing procedure may be performed even simultaneously, e.g., through a final pressure shock, by providing a piston 9 with an edge pattern 10 corresponding to the groove pattern 7 of the substrate, as exemplarily demonstrated by FIG. 5.

Depending on the mechanical properties of the substrate material, the dividing procedure may be further facilitated by providing the surface of the support 11 with a groove pattern 12 corresponding to the groove pattern 7 of the substrate, as shown exemplarily by FIG. 5.

Although not shown in the Figures, but easy understandable, the groove pattern may be provided alternatively on the bottom surface of the substrate 6 with the edge/groove pattern on piston 9 and support 11 reversed. Moreover, as is also not shown in the Figures since it is only a useful duplication, the substrate 6 may be provided with a groove pattern 7 on both its top and bottom surfaces whereby an arbitrary choice of the patterns 10 and 12 on the piston 9 and the support 11 is possible.

Figure 6:
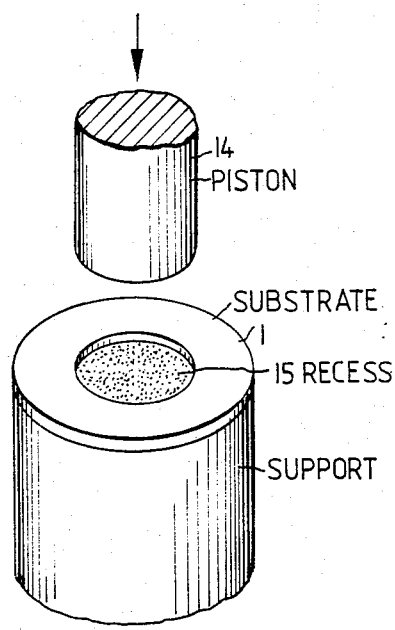
FIG. 6 is a schematic view showing the hot-pressing of TL powder into a recess in the surface of a substrate.

As mentioned above with regard to FIG. 1c, the TL-sensitive layer may cover the substrate 1 only partially and be confined to a recess with such an embodiment of the detector, the TL-sensitive layer may be hot-pressed by a suitably shaped piston 14 into the recess 15 of the substrate 1 as illustrated in FIG. 6. Confined to the recess 15 the TL powder can be proportioned very accurately.

It has been briefly mentioned above that burdened and heated rolls may equally serve as pressing tools. For the demonstration of the principle involved, FIG. 7 shows an arrangement with two opposed rolls 20 and 21 compressing a grooved substrate plate 6 which carries on its surface the uniformly distributed TL powder layer 8. The single or individual detectors will break off of the plate 6 after passing between the rolls 20 and 21, which in some cases may be provided again with an appropriate edge/groove pattern.

Figure 8:
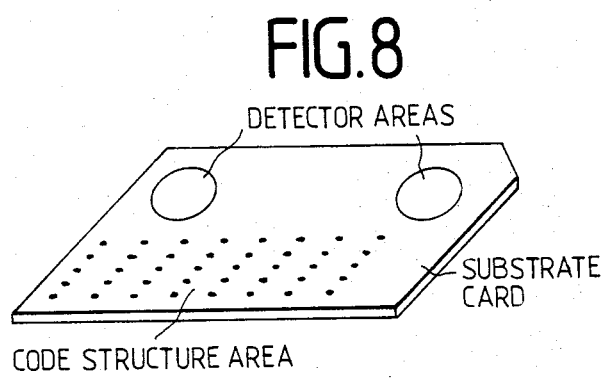
FIG. 8 is a view of a partially covered substrate card carrying two hot-pressed detector areas and a hole code structure.

Preferably, a thin layer detector manufactured according to the invention is designed so that the detector layer 2 only partially covers the surface of the substrate 1, as shown, for example, in FIGS. 1b and 1c. The remaining uncovered substrate surface can then be used for the engraving of an identification structure, holes or recesses forming a binary code which can be read automatically by a reader in order to identify a particular detector. An example of such device is shown in FIG. 8.

It will be understood that the above description of the present invention is susceptible to various modifications, changes and adaptations, and the same are intended to be comprehended within the meaning and range of equivalents of the appended claims.

What is claimed is:

1. A method of manufacturing a thin layer detector for solid state thermoluminescence dosimeters comprising the steps of: providing a substrate with suitably prepared surface; depositing a layer of a powder of a suitable thermoluminescent material on said prepared surface of the substrate; and simultaneously applying high pressure and elevated temperature to the powder layer at pressure and temperature values sufficient to cause plastic flow of the powder grains and physicochemical bonding of the powder material with said surface of the substrate, whereby a thin hot-pressed layer of the thermoluminescent material is formed on and bonded to said surface of said substrate.

2. The method defined in claim 1, wherein said temperature and pressure values are selected in an area, where the thermoluminescence response of the resulting layer of detector material is a relative maxima.

3. The method of claim 1, wherein said thermoluminescent material is a material with easy plastic flow.

4. The method defined in claim 1, wherein the substrate is formed of a heat-resistant material of low effective atomic number.

5. The method defined in claim 4, wherein said substrate is formed of one of the elements Be, B, Mg, Al or Si, or of the compounds BeO, MgO, $Al_2O_3$.

6. The method defined in claim 5, wherein said step of providing includes preparing said surface of said substrate by sandblasting or etching.

7. The method defined in claim 1, wherein said step of providing includes preparing said surface of said substrate by flame-spraying a surface bonding layer onto said surface of said substrate.

8. The method defined in claim 7, wherein said bonding layer comprises B, Mg, Al or Si.

9. The method defined in claim 1, wherein said substrate comprises graphite.

10. The method defined in claim 1, wherein said step of providing includes preparing said surface of said substrate by the application of a light-reflection layer.

11. The method defined in claim 10, wherein said light reflection layer is formed of the metals Be, Al or Mg or of the compounds MgO and/or $Al_2O_3$.

12. The method defined in claim 10, wherein the reflection layer is applied by flame-spraying.

13. The method defined in claim 1, wherein: said substrate is a large plate suitable for the formation of a plurality of thin layer detectors; said step of depositing includes depositing said layer of powder material over an area of said surface sufficient to form a plurality of said thin layer detectors; said step of simultaneously applying is carried out simultaneously for the plurality of detectors; and further comprising subsequently dividing said substrate with the hot-pressed detector layer into said plurality of individual thin layer detectors.

14. The method defined in claim 13, wherein: said substrate is provided with a groove pattern corresponding to the shape of the individual detectors; and said step of dividing includes simultaneously dividing said substrate into said plurality of individual detectors by the application of a very short pressure overload.

15. The method defined in claim 13, wherein: pressure is applied by means of a pressure tool which has an edge pattern corresponding to the outline of the individual detectors; and said step of dividing is carried out simultaneously for all said detectors by said edge pattern.

16. The method defined in claim 1, wherein: said surface of said substrate is provided with a recess; and said step of applying high pressure and elevated temperature includes applying said temperature and pressure to the layer of powder material in the recess with a suitably shaped pressing tool.

17. The method defined in claim 1, wherein said step of simultaneously applying high pressure and elevated temperature is carried out by rolling.

18. The method defined in claim 1, wherein said layer of thermoluminescent material powder is deposited so as to only partially cover said surface of said substrate.

19. The method defined in claim 18, further comprising forming a code structure for identification of the individual detectors in the non-covered portion of the substrate surface.

20. The method defined in claim 3, wherein said thermoluminescent material is LiF, $Li_2B_4O_7$ or $CaF_2$.

21. The method defined in claim 1 wherein said elevated temperature utilized is a temperature up to approximately 400° C.

* * * * *